June 5, 1945. E. GUSTAFSSON ET AL 2,377,549
LIQUID AND GAS SEPARATOR
Filed July 22, 1942 3 Sheets-Sheet 2
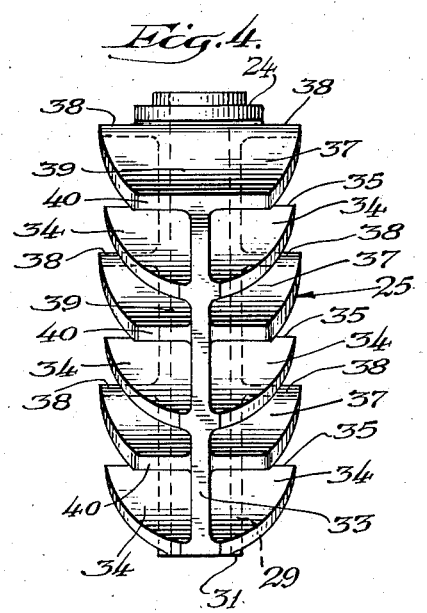
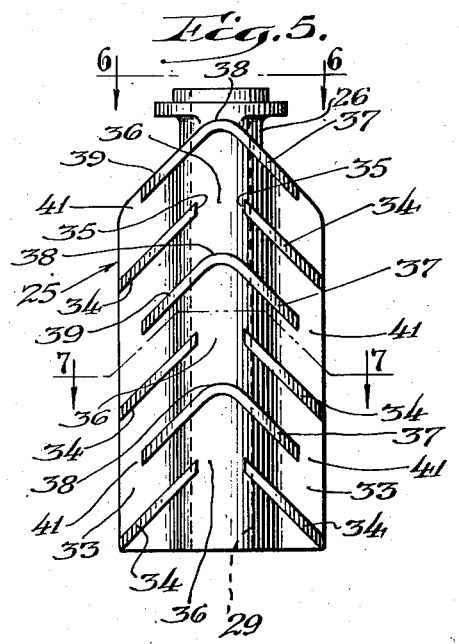
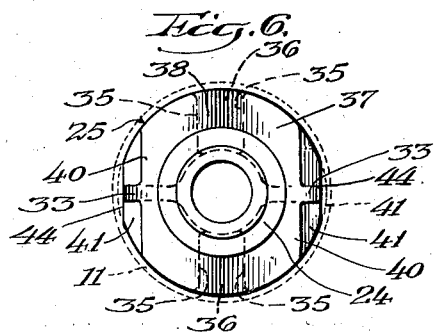
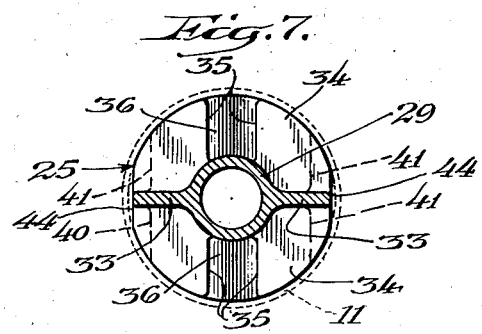
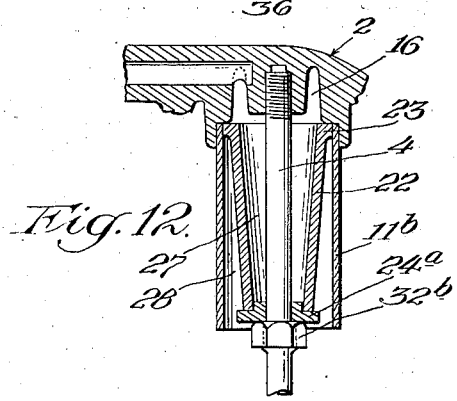
Inventors:
Eric Gustafsson
John W. Baur
By Louis A. Bisson,
Attorney.

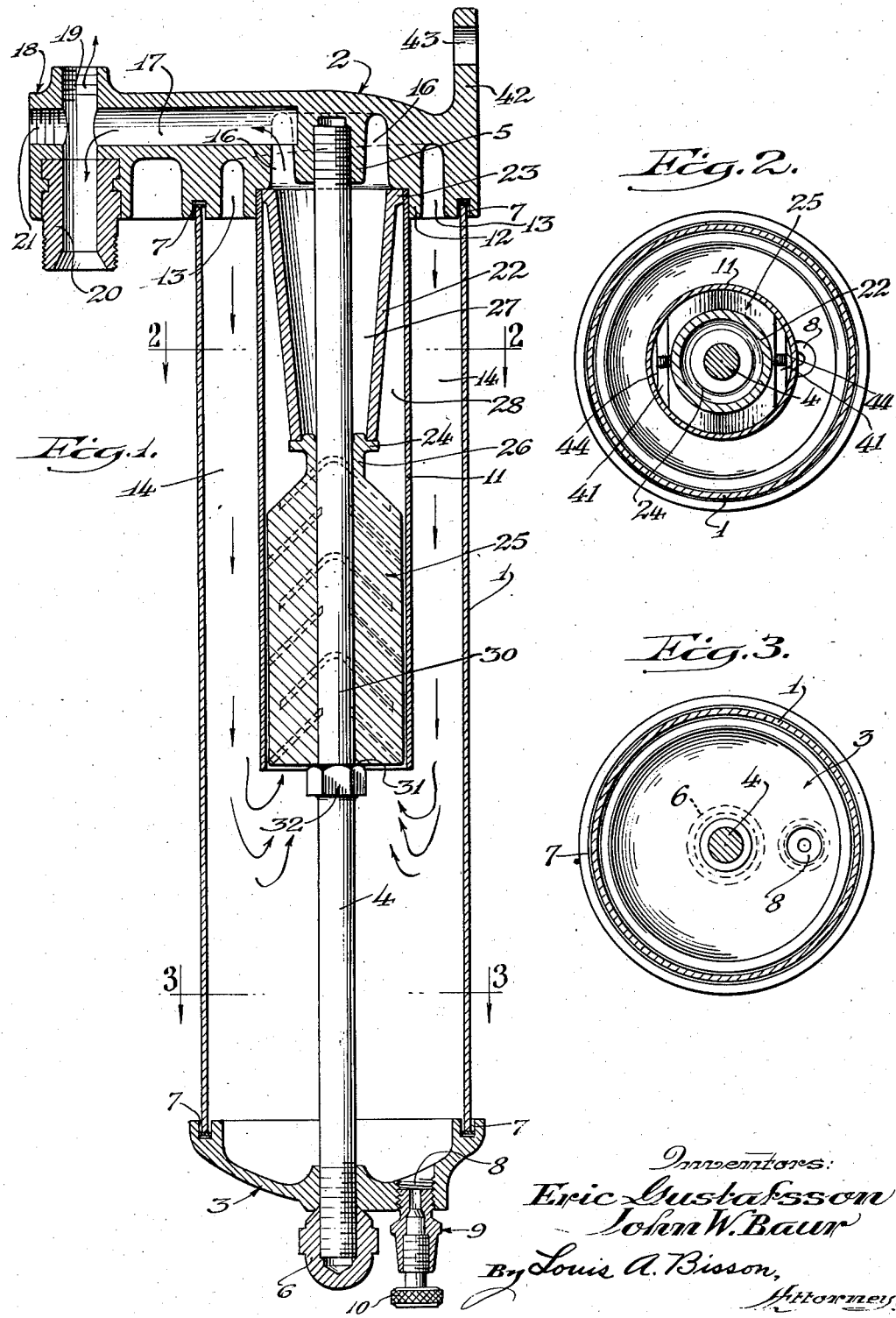

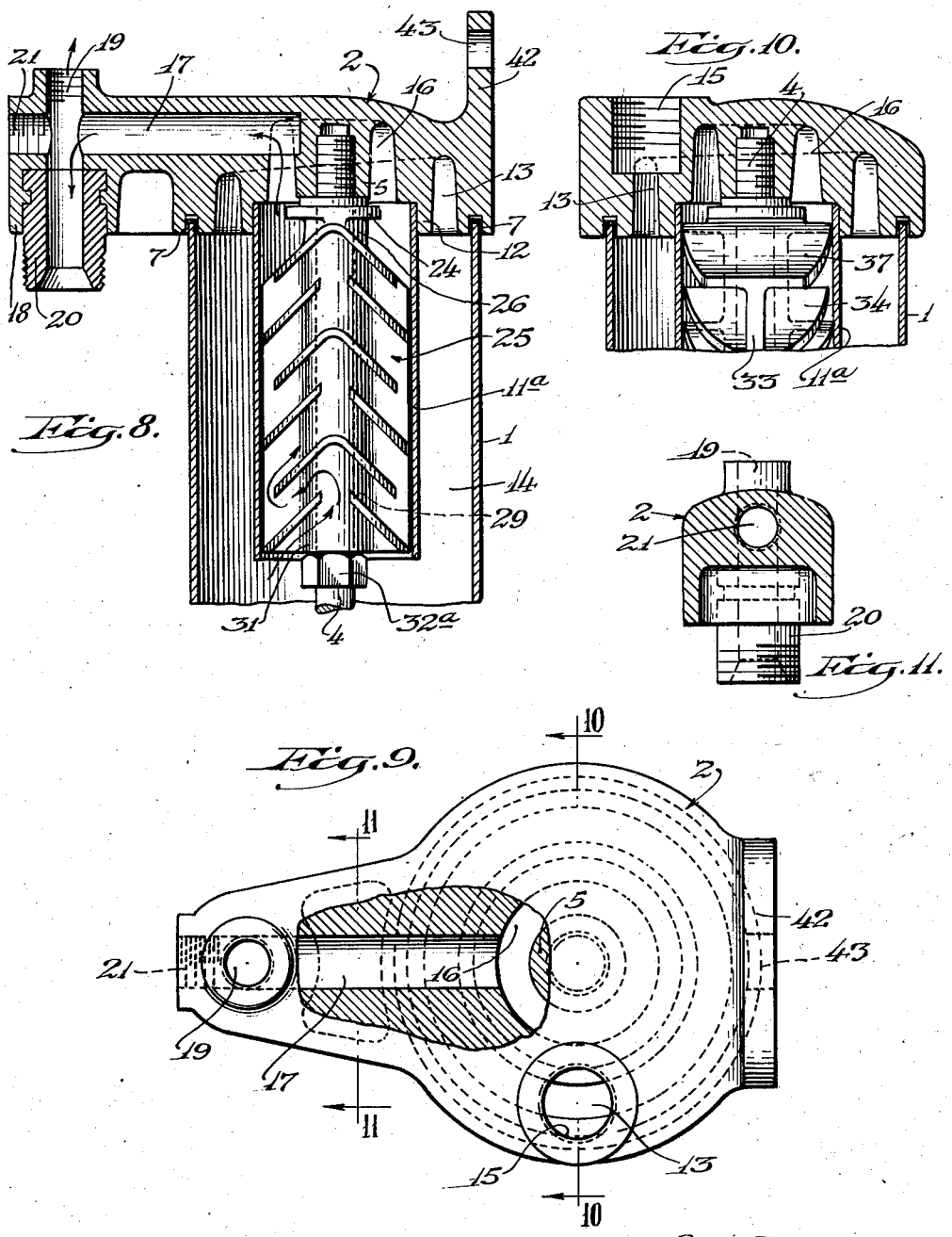

Patented June 5, 1945

2,377,549

UNITED STATES PATENT OFFICE 2,377,549

LIQUID AND GAS SEPARATOR

Eric Gustafsson and John W. Baur, Chicago, Ill., assignors to Binks Manufacturing Company, Chicago, Ill., a corporation of Delaware Application July 22, 1942, Serial No. 451,828

4 Claims. (Cl. 183—49)

The present invention relates to liquid and gas separators and particularly to those for separating foreign matter such as oil, moisture, dust, etc., from air whereby clean air may be used industrially as in spray devices such as spray guns for spraying coating material of various kinds in different uses.

Among the objects of the invention is to provide a novel, simple and efficient separating means having a body with caps at the ends thereof and held in place by a tie means and having in the body a novel baffle device with or without a filter means associated with the baffle device. The air stream is caused to reverse its direction of flow repeatedly so that the carried matter will be cast out and will settle in the bottom of the device where it can be drained out as and when desired.

Other objects, capabilities, advantages, features and the like are comprehended by the invention as will later appear and as are inherently possessed by the invention.

Referring to the drawings:

Fig. 1 is a vertical sectional view of a separator constructed in accordance with the invention;

Fig. 2 is a transverse sectional view taken in a plane represented by line 2—2 in Fig. 1 of the drawings;

Fig. 3 is a transverse sectional view taken in a plane represented by line 3—3 in Fig. 1 of the drawings;

Fig. 4 is a view in elevation of a baffle device forming part of the invention;

Fig. 5 is a view in elevation of said baffle device at right angles to the view shown in Fig. 4;

Fig. 6 is a top plan view taken in a plane represented by line 6—6 in Fig. 5 of the drawings;

Fig. 7 is a transverse sectional view taken in planes represented by line 7—7 in Fig. 5 of the drawings;

Fig. 8 is a fragmentary vertical sectional view of an alternative form of device;

Fig. 9 is a broken top plan view of the embodiments shown in Figs. 1 and 8;

Fig. 10 is a fragmentary vertical sectional view taken in a plane represented by line 10—10 in Fig. 9 of the drawings;

Fig. 11 is a vertical sectional view taken in a plane represented by line 11—11 in Fig. 9 of the drawings; and Fig. 12 is a fragmentary sectional view of an alternative form of the device.

Referring more in detail to the drawings the embodiments chosen to illustrate the invention are shown as comprising a tubular body or chamber 1 connected between an upper cap 2 and a lower cap 3, all being firmly held together by a tie rod or bolt 4 threaded at its upper end in a socketed portion or hub 5 of the cap 2 and having its lower end extending through the lower cap 3, such lower end being threaded to receive a clamping nut 6 bearing against the cap 3. The ends of the body 1 fit into annular channels 7 provided in the caps 2 and 3, in which channels may be provided suitable packing to seal the body 1 to the caps 2 and 3. The cap 3 has a drain outlet 8 to which is connected any suitable drain valve 9 having a handle 10.

Within the chamber 1 is an inner chamber 11 having its upper end securely fitted in a flange portion 12 of the cap 2 and its lower end being freely open. The cap 2 has an annular channel 13 open to the upper end of the annular chamber 14 formed between the chamber walls 1 and 11. At the top of the cap 2 is provided a suitable inlet means 15 (see Fig. 9) communicating with the annular channel 13 for offering an inlet passage for the gas, such as air, which is laden with impurities, such as oil, water, and the like, to and into the chamber 14.

In the cap 2 is also provided an annular channel 16 which is open at its lower side to the upper space of the chamber 11 or 11a. Leading laterally from the channel 16 within the body of the cap 2 is provided a passage 17 leading to a T-fitting 18 which has a threaded port 19 for connection to a gauge (not shown) and an outlet coupling 20 for connection of a duct (not shown) which may be connected to a suitable pressure regulator (not shown). A suitable plug 21 may be provided in the fitting opposite the passage 17.

Referring to the form shown in Fig. 1, within the upper portion of the chamber 11 is provided a porous filter member 22 of frusto-conical shape, having at its upper end a flange 23 fitting closely in the upper end of the chamber 11, and having its lower end seated upon a flanged or shouldered portion 24 forming part of a neck portion 26 at the upper end of a baffle device 25. The filter member 22 may be of any suitable porous and rigid material, such as sintered bronze or similar porous metal. Thus are provided an inner chamber 27 within the cone 22 and an outer chamber 28 surrounding the cone 22. In the form of device shown in Fig. 8 the cone structure is omitted and the shouldered or flanged part 24 of the baffle device 25 seats upwardly against the lower end of the hub portion 5 of the top cap 2.

The baffle device 25 comprises a central tubular portion 29 through which extends the upper portion 30 of the tie rod or bar 4. The lower end 31 of the tubular portion 29 seats upon a nut portion or collar 32 (Fig. 1) or 32a (Fig. 8) fixed to the tie rod 4. The baffle device 25 fits closely into the tubular member 11 (Fig. 1) or tubular chamber 11a (Fig. 8).

The baffle device 25 has vertical radial web portions 33 integral with the tubular portion 29. Formed integrally with and spaced vertically along the webs 33 and the tubular portion 29 are inclined sector shaped baffle plates 34 with the inner edges 35 of the sector plates 34 on one side spaced from the edges 35 of the sector plates 34 on the other side so as to provide ports 36 between said opposed edges 35 and through which ports passes the air being baffled. The lower end portions of the sector plates 34 are integral with the vertical webs 33 and are cut away along a chord to provide a segment shaped port 44 between the wall of the chamber 11 or 11a and the baffle device for the downward movement of the extracted matter toward and to the lower part of the chamber 1.

Also formed integrally with and spaced vertically along the tubular portion 29 and the webs 33 are segment shaped baffle plates 37 these plates alternating with the plates 34, being spaced therefrom and arranged in angular relation of 90° about the tubular portion 29. These plates 37 are also in bent or of dihedral angular form with their apical portions 38 uppermost and their side portions 39 inclining downwardly (see Fig. 5). These dipping side portions 39 have chorded edge portions 40 so spaced from the wall of the chamber 11 or 11a to provide segment shaped ports 41 for the passage of the air between the edges 40 and the wall of the chamber 11 or 11a.

The cap 2 may have a lug 42 provided with a hole 43 by which the device may be hung as from a hook, nail, bolt, or screw secured to a wall (not shown).

The device may be made without the baffle device but with the filter member 22 as shown in Fig. 12 held with its upper end at the upper end of the chamber 11b in communication with the channel 16 of the top cap 2, and with its lower end seated upon the flanged or shouldered portion of a closure cap 24a for the lower end of the filter member 22. The cap 24a rests upon the nut portion 32b on the tie rod 4. In other respects this form is similar to the others shown on the drawings.

In operation the gas, such as air, passes into the device by way of the inlet 15, channel 13 and thence downwardly into the annular chamber 14 between the chamber walls 1 and 11 or 11a or 11b, and also into the lower portion of the chamber 1, where the flow or stream turns upwardly to pass through the baffle device (Figs. 1 and 8) or the filter device (Fig. 12), as shown by the arrows in Fig. 1 etc. As the stream turns or changes its course some of the matter carried by the air will be cast out and fall or settle in the lower part of the chamber 1 and on the lower cap 3.

The stream as it flows upwardly into the baffle device 25 will follow tortuous paths among the baffle plates 34 and 37 (see arrows in Fig. 8 by way of illustration). Because of the inclination of the baffle plates and their alternate relation the streams are caused to reverse their direction of flow repeatedly and to cast out more of the material carried by the air. The thus cast out material will pass down by way of the ports 41 and 44, the latter being between the baffle device 25 at the web loci and the wall of the chamber 11 or 11a, and thence down into the lower portion of the chamber 1.

The finer particles of the material and residual moisture or the like still being carried by the air will be extracted as the air passes through the pores of the porous filter cone 22, as the air flows from the chamber 28 to the chamber 27. The air then in clean condition passes by way of the channel 16, passage 17 and outlet 20, and to the spray guns or other devices using desirably clean air.

In the case of the device shown in Fig. 12 the stream turns and passes upward into the space 28, thence through the pores of the filter member 22 and into the space 27, and thence to the channel 16 in the cap 2.

While we have herein described and on the drawings shown illustrative embodiments of the invention it is to be understood that the invention is not limited thereto but comprehends other constructions, arrangements of parts, details, features and the like without departing from the spirit of the invention.

Having thus disclosed the invention, we claim:

1. A liquid and gas separator comprising a hollow body having an open upper end, a closure for said upper end and having spaced channels therein provided with openings for establishing communication between the interior of said hollow body and said channels, one of said channels having an inlet for fluid to be cleaned and the other an outlet for clean fluid, an inner open ended hollow body having its upper end engaging said closure between said channels and its lower end terminating intermediate the length of the outer hollow body to provide a flow passage between the inner hollow body and the first named hollow body, a rod depending from said closure within the inner tubular member and having a shoulder thereon, a baffle member surrounding said rod and located within the open ended inner hollow member and with its lower end resting on said shoulder, and a porous filter surrounding said rod and clamped between the upper end of the baffle member and said closure whereby the baffle member and filter are maintained in position within the open ended tubular body.

2. A liquid and gas separator comprising a hollow body having an open upper end, a closure for said upper end and having spaced channels therein provided with openings for establishing communication between the interior of said hollow body and said channels, one of said channels having an inlet for fluid to be cleaned and the other an outlet for clean fluid, an inner open ended hollow body having its upper end engaging said closure between said channels and its lower end terminating intermediate the length of the outer hollow body to provide a flow passage between the inner hollow body and the first named hollow body, a rod depending from said closure within the inner tubular member and extending to a point below the lower end of the first mentioned body and having a shoulder thereon intermediate its ends, a baffle member surrounding said rod and located within the open ended inner hollow member and with its lower end resting on said shoulder, a porous filter surrounding said rod and clamped between the upper end of the baffle member and said closure whereby the baffle member and filter are maintained in position within the open ended tubular body, and a closure for the lower end of the first mentioned tubular body, removably secured to the lower end of said rod.

3. A liquid and gas seperator comprising a hollow body having an open upper end, a closure for said upper end and having spaced channels therein provided with openings for establishing communication between the interior of said hollow body and said channels, one of said channels having an inlet for fluid to be cleaned and the other an outlet for clean fluid, an inner open ended hollow body having its upper end engaging said closure between said channels and its lower end terminating intermediate the length of the outer hollow body to provide a flow passage between the inner hollow body and the first named hollow body, a rod depending from said closure within the inner tubular member and having a shoulder thereon, a baffle member surrounding said rod and located within the open ended inner hollow member and with its lower end resting on said shoulder, and a frustro-conical porous filter surrounding said rod and clamped between the upper end of the baffle member and said closure with the small end of the filter in engagement with the baffle member and the large end contacting the inner walls of the inner tubular member and engaging said closure whereby the baffle member and filter are maintained in position within the separator.

4. A liquid and gas separator comprising a hollow body having an open upper end, a closure for said upper end and having spaced channels therein provided with openings for establishing communication between the interior of said hollow body and said channels, one of said channels having an inlet for fluid to be cleaned and the other an outlet for clean fluid, an inner open ended hollow body having its upper end engaging said closure between said channels and its lower end terminating intermediate the length of the outer hollow body to provide a flow passage between the inner hollow body and the first named hollow body, a rod depending from said closure within the inner tubular member and having a shoulder thereon, a baffle member surrounding said rod and located within the open ended inner hollow member and with its lower end resting on said shoulder, said baffle member having an annular rib surrounding said rod to form an annular shoulder, and a porous frustro-conical filter surrounding said rod and clamped between the upper end of the baffle member and closure with the smaller end of the filter in engagement with said annular shoulder to space said end from the rod and inner tubular member and the large end contacting the walls of the inner tubular member and engaging said closure whereby the baffle member and filter are maintained in position with the filter walls spaced from the inner tubular member.

ERIC GUSTAFSSON.
JOHN W. BAUR.